US008688519B1

(12) United States Patent
Lin et al.

(10) Patent No.: US 8,688,519 B1
(45) Date of Patent: Apr. 1, 2014

(54) TARGETING MOBILE APPLICATIONS THROUGH SEARCH QUERY MINING

(75) Inventors: Jennifer Lin, Mountain View, CA (US); Ping Wu, San Bruno, CA (US); Deepak Chandra, Mountain View, CA (US)

(73) Assignee: Google Inc., Mountain View, CA (US)

( * ) Notice: Subject to any disclaimer, the term of this patent is extended or adjusted under 35 U.S.C. 154(b) by 463 days.

(21) Appl. No.: 12/649,769

(22) Filed: Dec. 30, 2009

(51) Int. Cl.
*G06Q 30/00* (2012.01)

(52) U.S. Cl.
USPC .................. 705/14.54; 705/14.64; 705/14.53; 705/14.61

(58) Field of Classification Search
USPC .......................................................... 705/14
See application file for complete search history.

(56) References Cited

U.S. PATENT DOCUMENTS

| | | | |
|---|---|---|---|
| 2007/0061331 A1* | 3/2007 | Ramer et al. ................. | 707/10 |
| 2010/0079336 A1* | 4/2010 | Skibiski et al. .......... | 342/357.07 |
| 2010/0124911 A1* | 5/2010 | Leeder ....................... | 455/414.1 |

FOREIGN PATENT DOCUMENTS

| | | |
|---|---|---|
| WO | 2005/024667 A1 | 3/2005 |
| WO | 2007070358 A2 | 6/2007 |
| WO | 2008045701 A2 | 4/2008 |

* cited by examiner

*Primary Examiner* — John G Weiss
*Assistant Examiner* — Eric Netzloff
(74) *Attorney, Agent, or Firm* — Lerner, David, Littenberg, Krumholz & Mentlik, LLP (57) ABSTRACT

Systems and methods are provided for identifying keywords for use in targeted advertising. Information concerning a region of interest is derived from data provided by a number of user devices within the region of interest. The information may come from actions such as search queries or communication with other users in the region of interest. In many cases, the information is time sensitive, with the actions occurring within a given timeframe. The time sensitive information for the region of interest is used to derive keywords that are used when selecting advertisements. These advertisements are then provided to users concerning the region of interest. Demographic information may also be used in conjunction with the timeframe and region to further refine the keywords.

15 Claims, 5 Drawing Sheets

TARGETING MOBILE APPLICATIONS THROUGH SEARCH QUERY MINING

BACKGROUND OF THE INVENTION

1. Field of the Invention

The invention relates generally to location-related services and applications. More particularly, aspects are directed to targeted advertising based on time-sensitive information, location information and user demographic information.

2. Description of Related Art

Mobile applications have experienced significant growth as next generation mobile user devices have become available. Advertising is often provided in conjunction with such applications. It is possible to identify certain advertisements of interest based on search engine queries. For instance, content-based systems may retrieve ads that are semantically relevant to a web page being viewed by a user. However, this may not be feasible for mobile applications, and may not identify relevant advertisements in time-sensitive situations.

SUMMARY OF THE INVENTION

According to an aspect of the invention, systems and methods perform temporal-spatial evaluations on queries and other activities by users of mobile devices to derive keywords that are suitable for highly targeted advertising. The targeted advertising may be provided to the same or different users.

In accordance with one embodiment, a method for providing targeted advertising information is provided. The method comprises identifying a region of interest around a physical location; receiving actions from any users within the region of interest, the actions being performed on user devices associated with corresponding ones of the users; determining whether the received actions occurred within a given timeframe; obtaining at least one keyword based upon the received actions within the given timeframe; and using the at least one keyword to select a specific advertising element from an advertisement database for use in an advertisement directed to selected users within the region of interest.

In one alternative, the received actions include at least one of a search query, an action taken in a mapping application, posting information to other users, and real-time communication with another user. In this case, the at least one keyword may be obtained by identifying a term within one or more of the received actions. Optionally, the at least one keyword is obtained by deriving it based upon information associated with one or more of the received actions.

In another alternative, the method further comprises identifying a peak in the received actions within the given timeframe; and providing the advertisement to the selected users within the region of interest during a time near the peak.

In a further alternative, the method further comprises identifying a peak in the received actions within the given timeframe; determining whether the received actions are associated with a recurring event within the region of interest; and providing the advertisement to the selected users within the region of interest prior to the peak at a subsequent recurrence of the event. In this case, the selected users may be identified based on demographic information associated with the selected users or the user devices of the selected users.

In one example, the received actions are queries sent from the user devices and the method further comprises assigning a confidence to the at least one keyword. Desirably, the confidence is selected depending upon at least one of a frequency of the received actions and when the received actions occur within the given timeframe. And in a further example, the actions received within the given timeframe are correlated with at least one user interest category. In this case, the at least one keyword is obtained depending upon the at least one user interest category.

In accordance with another embodiment, a system for providing targeted advertising information is provided. The system comprises memory for storing data and a processor. The processor is configured to identify a region of interest around a physical location. It is also configured to receive actions from any users within the region of interest and store information associated with the actions in the memory. The actions are performed on user devices associated with corresponding ones of the users. The processor is further configured to determine whether the received actions occurred within a given timeframe, obtain at least one keyword based upon the received actions within the given timeframe, and use the at least one keyword to select a specific advertising element from an advertisement database for use in an advertisement directed to selected users within the region of interest.

In one example, the system further comprises means for communicating with the user devices. Here, the processor is further configured to transmit the specific advertising element to the selected users for displaying on the user devices of the selected users during a predetermined timeframe. In an alternative, the at least one keyword is obtained by the processor identifying a term within one or more of the received actions. In another alternative, the at least one keyword is obtained by the processor deriving it based upon information associated with one or more of the received actions.

In yet another example, the processor is further configured to identify a peak in the received actions within the given timeframe, and to provide the advertisement to the selected users within the region of interest during a time near the peak.

In an alternative, the processor is further configured to identify a peak in the received actions within the given timeframe, determine whether the received actions are associated with a recurring event within the region of interest, and provide the advertisement to the selected users within the region of interest prior to the peak at a subsequent recurrence of the event. In this case, the selected users may be identified based on demographic information associated with the selected users or the user devices of the selected users.

In an example, the received actions are queries sent from the user devices and the system assigns a confidence to the at least one keyword. In this case, the confidence may be selected depending upon at least one of a frequency of the received actions and when the received actions occur within the given timeframe.

And in another example, the actions received within the given timeframe are correlated with at least one user interest category. Here, the at least one keyword is obtained depending upon the at least one user interest category.

DETAILED DESCRIPTION

Aspects, features and advantages of the invention will be appreciated when considered with reference to the following description of exemplary embodiments and accompanying figures. The same reference numbers in different drawings may identify the same or similar elements. Furthermore, the following description is not limiting; the scope of the invention is defined by the appended claims and equivalents.

Search engines may process billions of queries every day. Many queries (e.g., free text keywords) come from mobile devices, or from fixed locations such as desktop PCs, that search for local results on maps. Such information may be used as the basis to derive a set of representative queries for different geographical locations. The set of representative queries may be used as content for targeted advertising.

By way of example only, each search query from a mobile user device may include timestamp and user demographic information. Thus, it may be observed that one or more queries $Q_A$ are associated with a particular location A. The queries $Q_A$ may also be associated with a particular time $t_1$. Given this, an advertising application may pull or derive keywords from the set $Q_A$ to obtain advertisements that are directed to users around location A at the appropriate time.

In another example, a set of queries $Q_B$ may come from mobile user devices at or near location B. The users generating the queries $Q_B$ may be associated with one or more user interest categories ("UICs"). A given UIC may be identified based upon a search cookie or an advertisement cookie stored on the user's device. The queries $Q_B$ may be used as targeting data for other users associated with the given UIC. This targeting data is used to select relevant advertisements that can be directed to other users associated with that UIC. As different users are connected to the given UIC, the advertising system may place a high confidence that the targeting data will obtain a relevant advertisement(s) and a greater likelihood that recipients of that advertisement will act on it.

Figure 1A:
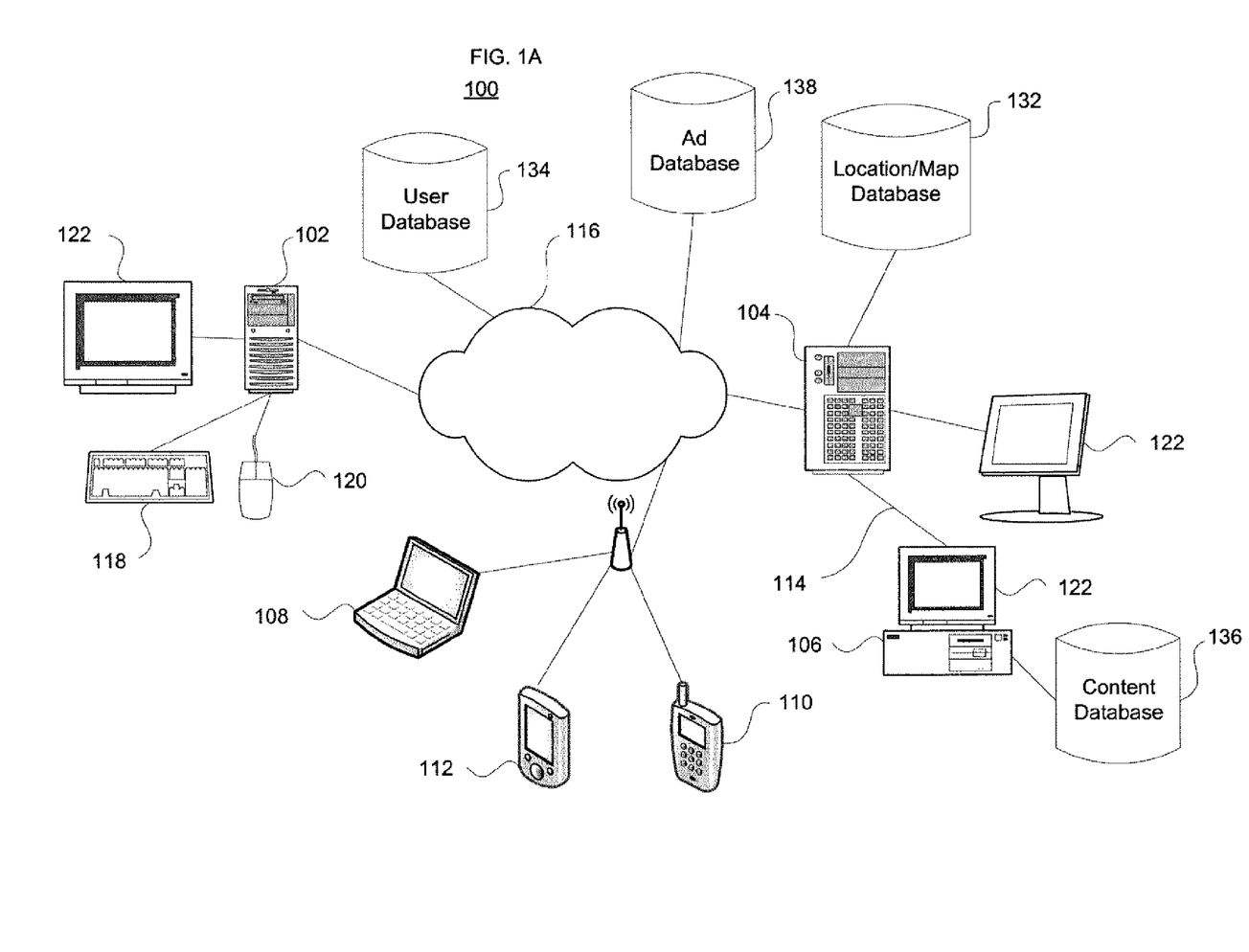
FIGS. 1A-B illustrate a computer system for use in accordance with aspects of the invention.
Figure 1B:
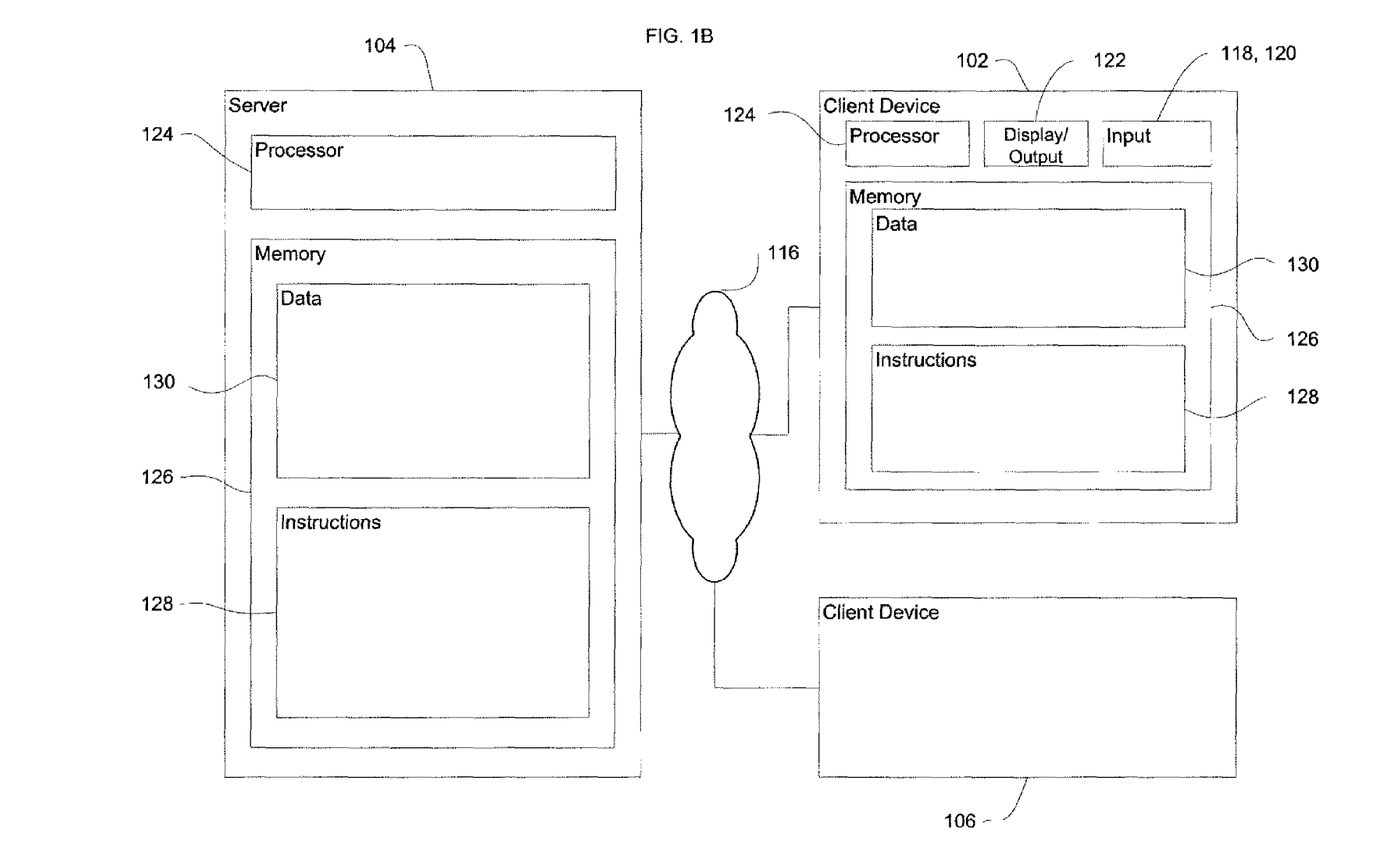

The advertising system may be part of a computer network as shown in FIGS. 1A-B. Turning to FIG. 1A, this illustration presents a schematic diagram of a computer system depicting various computing devices that can be used alone or in a networked configuration in accordance with aspects of the invention. For example, this figure illustrates a computer network 100 having a plurality of computers 102, 104, 106 and 108 as well as other types of user devices such as mobile phone 110 and a PDA 112. Various elements in the computer network 100 may be interconnected via a local or direct connection 114 and/or may be coupled via a communications network 116 such as a local area network ("LAN") such as a WiFi network, a wide area network ("WAN"), the Internet, etc. and which may be wired or wireless. The communications network 116 may include a plurality of nodes having routers, servers, wireless access points, etc.

Each computer can include, for example, one or more computing devices having user inputs such as a keyboard 118 and mouse 120 and/or various other types of input devices such as pen-inputs, joysticks, buttons, touch screens, etc., as well as a display 122, which could include, for instance, a CRT, LCD, plasma screen monitor, TV, projector, etc. Each computer 102, 104, 106 and 108 may be a personal computer, server, etc. By way of example only, computer 102 may be a personal computer, computers 104 and 106 may be servers, and computer 108 may be a laptop/palmtop. As shown in FIG. 1B each computer, such as computers 102 and 104, contains a processor 124, memory 126 and other components typically present in a computer.

Memory 126 stores information accessible by processor 124, including instructions 128 that may be executed by the processor 124 and data 130 that may be retrieved, manipulated or stored by the processor. The memory may be of any type capable of storing information accessible by the processor, such as a hard-drive, ROM, RAM, CD-ROM, DVD, Blu-Ray disk, flash memories, write-capable or read-only memories. The processor 124 may comprise any number of well known processors, such as processors from Intel Corporation. Alternatively, the processor may be a dedicated controller for executing operations, such as an ASIC.

The instructions 128 may comprise any set of instructions to be executed directly (such as machine code) or indirectly (such as scripts) by the processor. In that regard, the terms "instructions," "steps" and "programs" may be used interchangeably herein. The instructions may be stored in any computer language or format, such as in object code or modules of source code. The functions, methods and routines of instructions in accordance with the present invention are explained in more detail below.

Data 130 may be retrieved, stored or modified by processor 124 in accordance with the instructions 128. The data may be stored as a collection of data. For instance, although the invention is not limited by any particular data structure, the data may be stored in computer registers, in a relational database as a table having a plurality of different fields and records, XML documents, or flat files. Map-type image data may be stored in flat files such as keyhole flat files ("KFF"). Content and advertising data may be stored in one or more relational databases.

The data may also be formatted in any computer readable format such as, but not limited to, binary values, ASCII etc. Similarly, the data may include images stored in a variety of formats such as vector-based images or bitmap images using lossless (e.g., BMP) or lossy (e.g., JPEG) encoding. Moreover, the data may include any information sufficient to identify the relevant information, such as descriptive text, proprietary codes, pointers, references to data stored in other memories (including other network locations) or information which is used by a function to calculate the relevant data.

Although the processor 124 and memory 126 are functionally illustrated in FIG. 1B as being within the same block, it will be understood that the processor and memory may actually comprise multiple processors and memories that may or may not be stored within the same physical housing or location. For example, some or all of the instructions and data may be stored on a removable recording medium such as a CD-ROM, DVD or Blu-Ray disk. Alternatively, such information may be stored within a read-only computer chip. Some or all of the instructions and data may be stored in a location physically remote from, yet still accessible by, the processor. Similarly, the processor may actually comprise a collection of processors which may or may not operate in parallel. Data may be distributed and stored across multiple memories 126 such as hard drives, data centers, server farms or the like.

In one aspect, server 104 and/or server 106 communicate with one or more client computer devices 102 and/or 108, as well as client devices such as mobile phone 110 and PDA 112. Each client device may be configured with a processor, memory and instructions, as well as one or more user input devices 118, 120 and a user output device, such as display 122. Each client computer may be a general purpose computer, intended for use by a person, having all the components normally found in a personal computer such as a central processing unit ("CPU"), display, CD-ROM, DVD or Blu-Ray drive, hard-drive, mouse, keyboard, touch-sensitive screen, speakers, microphone, modem and/or router (telephone, cable or otherwise) and all of the components used for connecting these elements to one another.

The servers and client devices are capable of direct and indirect communication with other computers, such as over network 116. Although only a few computing devices are depicted in FIGS. 1A and 1B, it should be appreciated that a typical system can include a large number of connected servers and clients, with different devices being at different nodes of the network. The network 116, including any intervening nodes, may comprise various configurations and protocols including the Internet, intranets, virtual private networks, wide area networks, local networks, private networks using communication protocols proprietary to one or more companies, Ethernet, WiFi, Bluetooth and HTTP.

Communication across the network, including any intervening nodes, may be facilitated by any device capable of transmitting data to and from other computers, such as modems (e.g., dial-up or cable), network interfaces and wireless interfaces. Servers 104 and 106 may be application servers such as web server.

Although certain advantages are obtained when information is transmitted or received as noted above, other aspects of the invention are not limited to any particular manner of transmission of information. For example, in some aspects, the information may be sent via a medium such as a disk, tape, CD-ROM, DVD, Blu-Ray disk or directly between two computer systems via a dial-up modem. In other aspects, the information may be transmitted in a non-electronic format and manually entered into the system.

Returning to FIG. 1A, the network 100 may also include one or more databases for storing user data and content, map information and advertising data. For instance, a location/map database 132 may be directly or indirectly coupled to server 104. In an alternative, the location database 132 may be part of or otherwise logically associated with the server 104. The location database 132 may include different sets or types of data. By way of example only, the database 132 may maintain location and/or map-related data, which may be stored in one or more KFFs. The database 132 may also store the data 130 in one or more KFFs.

User-related information may be stored in a database 134. Such information may include, for instance, a search query history, a website searching history, map data, instant messaging archives, calendar entries and the like. Given the sensitive nature of this information, the database 134 should securely store the data to prevent unauthorized access. Thus, the data may be encrypted for storage. In one example, the database 134 is maintained on network 100 separate from the client devices. In another example, the database 134 may be locally stored in respective client devices, for example in the memory 126 thereof. In a further example, the database 134 comprises multiple databases or is part of another database. FIG. 1A also shows that the network 100 may include a content database 136 and an advertisement database 138. These databases may be stored in different memory systems in the network.

Figure 2A:
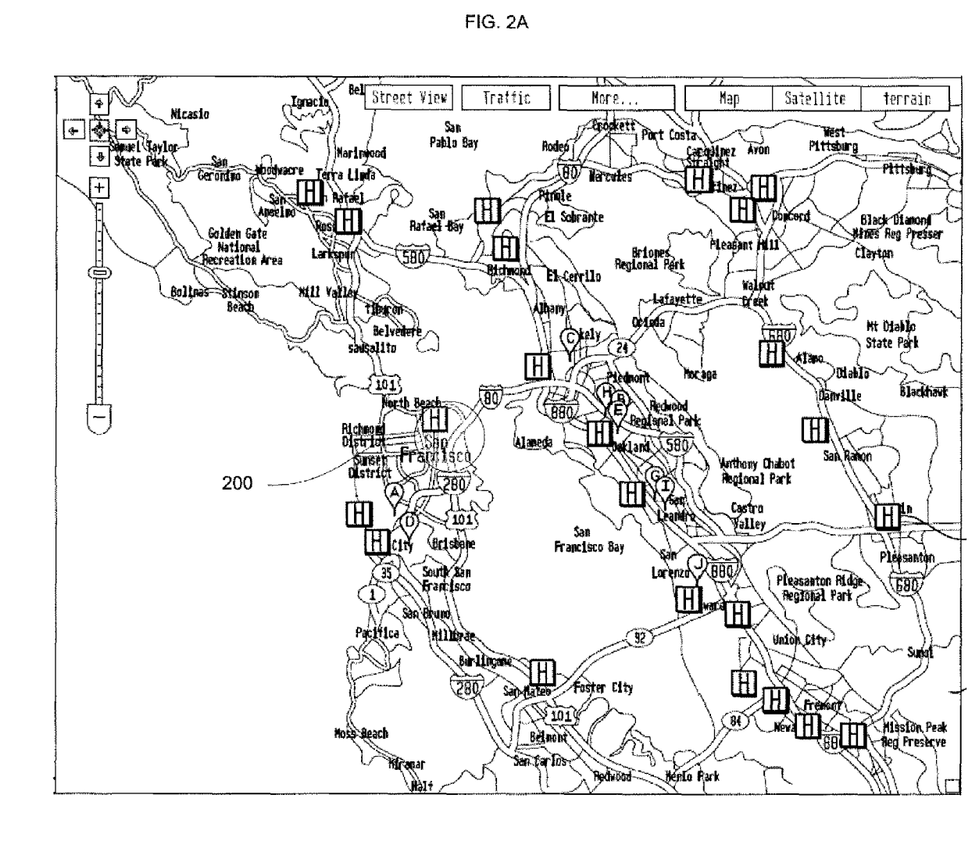
FIGS. 2A-B illustrate a location scenario in accordance with aspects of the invention.
Figure 2B:
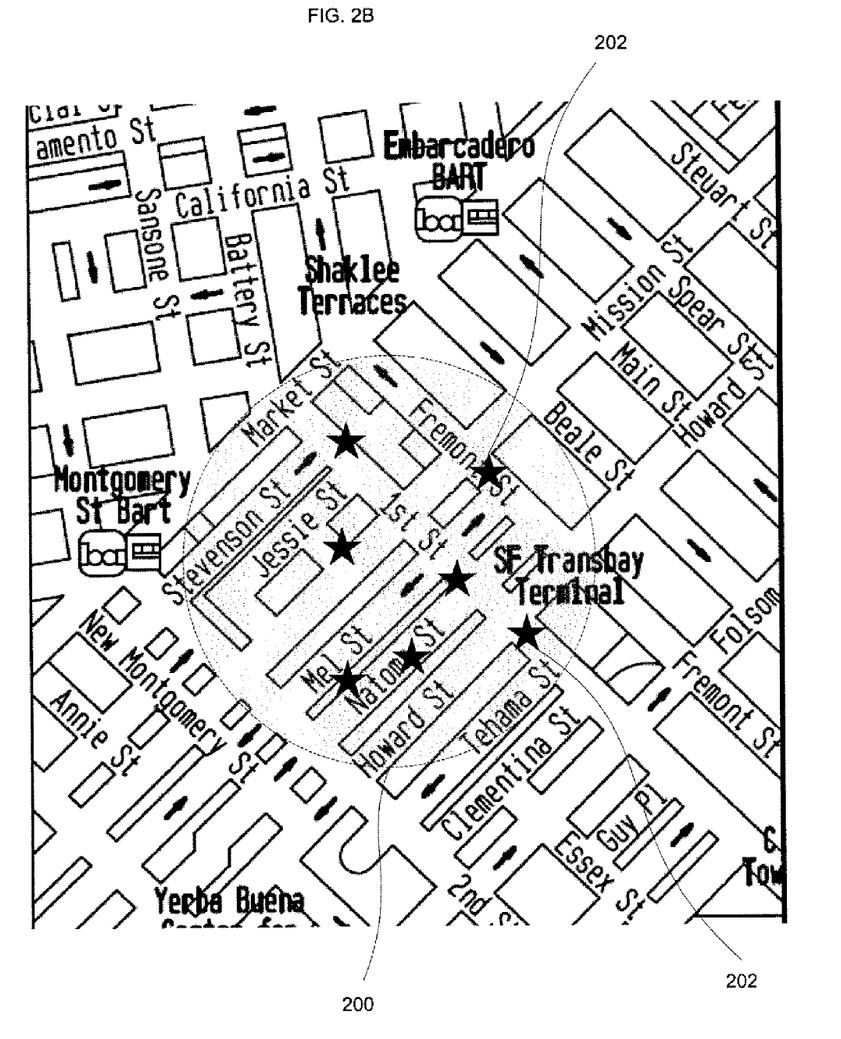

As indicated above, keywords and other information that may be used in focused/targeted advertising are derived from actions taken by different users in a particular geographic area around the same time. FIG. 2A illustrates a mapping application showing a map of the San Francisco area in which there is a region of interest 200. The region of interest is, for example, an area around a given physical location. For instance, the location may be a pair of latitude/longitude coordinates, a street address, a point on an electronic map or a point of interest. The point of interest may be a building, arena, monument, etc. FIG. 2B shows a close up view of the region 200 in which a number of users 202 are located. The region of interest may be, for example, a certain radius such as 50 or 200 meters. Or it may be expressed as being within a number of blocks or bounded by natural borders such as rivers.

The location of each user may be known from their use of user devices such as laptop 108, mobile phone 110 and PDA 112 (FIG. 1A). Each device may communicate with a network and/or with other devices using different protocols and interfaces. For instance, cellular networks, wireless LANs, WiFi, Bluetooth, etc. may be used. The location of a given device may be determined based upon GPS, triangulation, reverse geocoding and the like. Alternatively, the location of a device may be derived indirectly, for instance through that device's interaction with another device with a known location. In one example, a customer's mobile telephone may use a coupon in a store that has a known location. Thus, the location of the mobile telephone is known at the time when the coupon is used.

The users of the devices may take some action, such as request information from the network, for example, by sending search queries via a web page or by panning or zooming through a map in a mapping application. The search queries may be coupled with location information from the user's device. A user may also "tweet" or send an instant message to another user or may play an interactive mobile gaming application with other users in the region 200 or elsewhere. Other actions may include visiting websites for businesses or other points of interest within the region 200 via the Internet. Depending on the action taken or the information requested, the system may store certain data concerning the action or information in one or more databases such as location/map database 132, user database 134 or content database 136.

The data preferably includes time-based information. By way of example only, users within the region 200 may communicate with one another or search for information about a particular event (e.g., a concert or lecture) that is occurring or will occur. For instance, in the scenario presented above, the users may send queries via web browsers regarding a concert occurring at 9 pm that night, such as "where is the best place to park for the 9 pm concert on Jessie Street" or "looking for tickets to the concert tonight."

Figure 3:
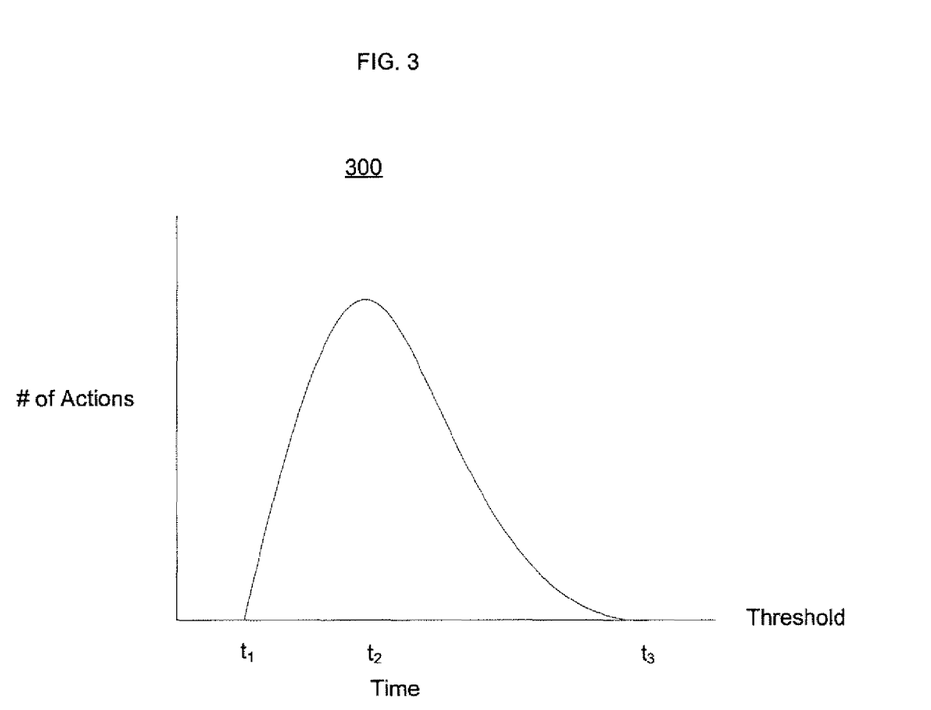
FIG. 3 illustrates a plot showing user actions occurring within a given timeframe in accordance with aspects of the invention.

FIG. 3 illustrates an example 300 of user actions occurring within the region 200 at a certain time range (timeframe). As shown, the number of actions may exceed some threshold and become significant enough to identify starting at time $t_1$. Using the above example, the actions may pertain to a concert that will occur in the region 200. The number of actions may increase until they reach a peak at time $t_2$, which may be when the concert starts. And then the number of actions may tail off until they fall below the threshold at time $t_3$.

Depending upon the number of actions (e.g., search queries, browsing, tweeting, IMing) and the information associated with those actions, server 104 or other entity in the system may obtain keywords (e.g., "concert," "tickets" or "parking") by identifying text or symbols within the actions. Or the keywords may be obtained by deriving them based upon information associated with the action (e.g., a search for a particular item or service). Those keywords may then be used by a server coupled to the ad database 138 to provide targeted advertising to the users within region 200, or to users outside of region 200 that may be interested in the concert or other item of interest. For instance, the selected keyword(s) is applied to the ad database to obtain one or more advertisements that can be sent to users. Thus, information regarding the location of parking lots, discounted seat prices, coupons for souvenirs, etc. may be provided as tailored advertisements at or near the time of the concert.

The number of actions and when they occur may directly affect what advertisements are provided and when they are provided. For instance, actions pertaining to parking and tickets may be given more weight if they occur before the start of the concert (e.g., before time $t_2$ in FIG. 3). The farther apart they are from the peak, the less weight may be applied to the actions. Thus, tweets that discuss parking for the concert which are made around time $t_3$ may be given much less weight than those made near time $t_2$. Here, the system may choose not to display advertisements about parking and instead advertise some other service such as a taxi service.

In addition to identifying keywords for use with real-time or soon to occur events, the system may also identify actions associated with recurring events or events that will occur at some point in the future. For instance, if a concert is held every Friday evening at 9 pm during the summer at region 200, the system may detect patterns such as that shown in FIG. 3 and identify that the patterns recur every Friday evening. This information may be coupled with other data, such as concert-related information stored in the content database (e.g., on-line ticket sales or merchandising). Thus, the system may leverage this information and begin providing targeted advertising at or prior to time $t_1$ each Friday. This a priori knowledge provides a substantial advertising advantage.

The system may further take advantage of user demographics when determining what keywords to employ. By way of example only, these demographics may be derived from knowledge about the users, which may be found in the user database 134, from the user's device, or by the actions taken by the user within the region 200. Thus, if the concert is for a band that has a following of 17-24 year olds, this information may be used to refine what types of advertisements are provided to the users in region 200 between times $t_1$ and $t_3$.

Returning to FIG. 3, one method of analyzing user actions within region 200 employs frequency-based counting. Here, every action (e.g., search query) is counted at a given point in time. Another method is analogous to the "inverted document frequency" concept. In this case, the frequency of a given term (e.g., "concert" or "tickets") may be normalized by the number of locations (e.g., points within region 200) where the term occurs. The frequency may also be normalized by the time(s) when a given term is used. Desirably, a combination of location(s) and time(s) is used (e.g., with spatial-temporal "buckets" or "bins") to determine where and when a given term is used, and the frequency of its use. This allows the system to identify queries or other actions that are unique or more prevalent in one location or area in a given timeframe and to assign those queries/actions a higher rank or weight than others.

Alternative methods for identifying keywords of interest may include the following. Contextual targeting may be applied to application content or placement targeting. Content for contextual targeting may come from a publisher or the content database management system sending content in an ad request URL. Or the content may come from web pages that mirror the application content. Yet another method targets mobile applications by automatically issuing a search query for a given application. Here, the system may retrieve the top N results from the application. Some or all of the N results may be used as the content or keyword(s) for targeted advertising. These alternatives are desirably constrained for advertising associated with the region of interest and/or within a timeframe of interest as discussed above.

The processes and operations set forth herein may be implemented directly by one or more hardware-based processors such as sub-processing units in a multiprocessor array. Alternatively, the processes and operations may be stored in a computer-readable recording medium such as flash memory, a CD-ROM, DVD, Blu-ray disk, a hard drive and the like for execution by a processor. The information may be stored in electronic or digital format as a program for execution by the processor.

Although aspects of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the invention as defined by the appended claims.

The invention claimed is:

1. A method for providing targeted advertising information, the method comprising:
   receiving a plurality of actions from a respective plurality of users within a geographic region, the plurality of actions being performed on user devices associated with corresponding ones of the users and having associated timestamps;
   determining, by one or more processors, that the plurality of received actions from the respective plurality of users correspond to an event occurring within a first period of time based on actions exceeding a first action threshold;
   obtaining at least one keyword for the geographic region from the plurality of received actions;
   determining, by the one or more processors, that the first period of time is associated with a recurring event within the geographic region;
   using the at least one keyword and information identifying a peak of the actions within the first period of time to select an advertisement to direct to a given user within the geographic region; and
   providing the advertisement to the given user within the geographic region during a subsequent recurrence of the event.

2. The method of claim 1, wherein the received actions include at least one of a search query, an action taken in a mapping application, a posting of information to other users, or a real-time communication with another user.

3. The method of claim 2, wherein the at least one keyword is obtained by identifying a term within one or more of the received actions.

4. The method of claim 1, wherein the at least one keyword is derived from information associated with one or more of the received actions.

5. The method of claim 1, wherein the given user within the geographic region is identified based on demographic information or based on a device associated with the given user.

6. The method of claim 1, wherein the at least one keyword is selected based on a frequency of occurrence in the plurality of received actions.

7. The method of claim 1, wherein the plurality of received actions are correlated with at least one user interest category, and the at least one advertisement is selected using the at least one keyword and the at least one user interest category.

8. The method of claim 1, wherein:
   a first one of the plurality of received actions occurs at a first point in time;
   a second one of the plurality of received actions occurs at a second point in time, the second point in time being closer to the actions peak than the first point in time;
   obtaining the at least one keyword includes obtaining a first keyword from the first received action and a second keyword from the second received action; and
   weighting the second keyword more heavily than the first keyword to select the advertisement.

9. The method of claim 1, wherein:
using the at least one keyword and information identifying the peak of the actions to select the advertisement includes identifying a first advertisement and a second advertisement; and
providing the advertisement to the given user within the geographic region during the subsequent recurrence of the event includes providing the first advertisement prior to the peak of the actions during the subsequent recurrence and providing the second advertisement after the peak of the actions during the subsequent recurrence.

10. A system for providing targeted advertising information, the system comprising:
one or more memories for storing data; and
one or more processors configured to:
receive a plurality of actions from a respective plurality of users within a geographic region and store information associated with the actions in the memory, the plurality of actions being performed on user devices associated with corresponding ones of the users and having associated timestamps;
determine that the plurality of received actions from the respective plurality of users correspond to an event occurring within a first period of time based on actions exceeding a first action threshold;
obtain at least one keyword for the geographic region from the plurality of received actions;
determine that the first period of time is associated with a recurring event within the geographic region;
use the at least one keyword and information identifying a peak of the actions within the first period of time to select an advertisement to direct to a given user within the geographic region; and
provide the advertisement to the given user within the geographic region during a subsequent recurrence of the event.

11. The system of claim 10, wherein the at least one keyword is obtained by identifying a term within one or more of the received actions.

12. The system of claim 10, wherein the at least one keyword is derived from information associated with one or more of the received actions.

13. The system of claim 10, wherein the given user is identified based on demographic information or based on a device associated with the given user.

14. The system of claim 10, wherein the at least one keyword is selected based on a frequency of occurrence in the plurality of received actions.

15. The system of claim 10, wherein the plurality of received actions are correlated with at least one user interest category, and the at least one advertisement is selected using the at least one keyword and the at least one user interest category.

* * * * *

UNITED STATES PATENT AND TRADEMARK OFFICE
CERTIFICATE OF CORRECTION

PATENT NO. : 8,688,519 B1
APPLICATION NO. : 12/649769
DATED : April 1, 2014
INVENTOR(S) : Lin et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 607 days.

Signed and Sealed this
Thirtieth Day of May, 2017

Michelle K. Lee
*Director of the United States Patent and Trademark Office*